(12) United States Patent
Hai (10) Patent No.: US 11,804,191 B2
(45) Date of Patent: Oct. 31, 2023

(54) METHOD, DEVICE, AND ELECTRONIC DEVICE FOR ADJUSTING VIEWING ANGLE FOR DARK STATE OF DISPLAY PANEL

(71) Applicant: Shenzhen China Star Optoelectronics Semiconductor Display Technology Co., Ltd., Guangdong (CN)

(72) Inventor: Bo Hai, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 475 days.

(21) Appl. No.: 17/046,798

(22) PCT Filed: Aug. 12, 2020

(86) PCT No.: PCT/CN2020/108619
§ 371 (c)(1),
(2) Date: Oct. 12, 2020

(87) PCT Pub. No.: WO2022/000717
PCT Pub. Date: Jan. 6, 2022

(65) Prior Publication Data
US 2023/0123257 A1    Apr. 20, 2023

(30) Foreign Application Priority Data

Jul. 2, 2020  (CN) .......................... 202010627774.2

(51) Int. Cl.
*G09G 3/36*  (2006.01)
*G09G 3/34*  (2006.01)
(Continued)

(52) U.S. Cl.
CPC ............. *G09G 3/36* (2013.01); *G02F 1/1323* (2013.01); *G09G 3/3406* (2013.01); *G02F 1/137* (2013.01);
(Continued)

(58) Field of Classification Search
CPC ............. G02F 1/1337; G02F 1/133602; G02F 1/133528; G02F 1/13363; G02F 1/13439;
(Continued)

(56) References Cited

U.S. PATENT DOCUMENTS 9,224,361 B2 * 12/2015 Song ....................... G09G 3/006
10,782,545 B2 * 9/2020 Smith ............... G02F 1/134309
(Continued)

FOREIGN PATENT DOCUMENTS

| CN | 1641418 | 7/2005 |
|---|---|---|
| CN | 102944946 | 2/2013 |

(Continued)

*Primary Examiner* — Dismery Mercedes (57) ABSTRACT

A method is provided for adjusting a viewing angle for a dark state of a display panel, and the method includes steps of: obtaining a first brightness change of a to-be-tested panel at a first viewing angle under a condition of a first voltage difference; obtaining a second brightness change of the to-be-tested panel at a second viewing angle under the condition of the first voltage difference; obtaining a ratio of the second brightness change to the first brightness change; and comparing the ratio of the second brightness change to the first brightness change with a first threshold to determine whether the first voltage difference is a selection voltage of the display panel.

17 Claims, 3 Drawing Sheets

(51) Int. Cl.
*G02F 1/13* (2006.01)
*G02F 1/137* (2006.01)

(52) U.S. Cl.
CPC ..... *G02F 1/1309* (2013.01); *G09G 2320/028* (2013.01); *G09G 2320/0233* (2013.01); *G09G 2320/0238* (2013.01); *G09G 2320/0242* (2013.01); *G09G 2320/068* (2013.01); *G09G 2320/0626* (2013.01); *G09G 2320/0693* (2013.01); *G09G 2360/16* (2013.01)

(58) Field of Classification Search
CPC ......... G02F 1/134309; G02F 1/134318; G02F 1/1336; G02F 1/133753; G02F 1/133757; G02F 1/133769; G02F 1/1323; G02F 1/137; G02F 1/1309; G09G 3/36; G09G 3/3607; G09G 3/3648; G09G 3/2003; G09G 3/3406; G09G 2320/028; G09G 2320/0693; G09G 2320/0233; G09G 2320/0626; G09G 2320/068; G09G 2320/0238; G09G 2320/0242
See application file for complete search history.

(56) References Cited

U.S. PATENT DOCUMENTS

| | | | |
|---|---|---|---|
| 11,114,051 B1* | 9/2021 | Hai | G09G 3/3611 |
| 11,287,688 B2* | 3/2022 | Chiu | G02F 1/133512 |
| 11,308,894 B2* | 4/2022 | Huang | G09G 3/03 |
| 11,423,854 B2* | 8/2022 | Shan | G09G 3/3607 |
| 2010/0060667 A1 | 3/2010 | Chen et al. | |
| 2012/0133683 A1* | 5/2012 | Goden | G09G 3/3233 345/77 |
| 2012/0162294 A1* | 6/2012 | Choi | G09G 3/3648 345/694 |
| 2019/0353943 A1* | 11/2019 | Smith | G02F 1/134309 |
| 2020/0326567 A1* | 10/2020 | Fang | G02F 1/133524 |
| 2021/0026194 A1* | 1/2021 | Jitsui | G02F 1/133528 |
| 2021/0055582 A1* | 2/2021 | Chen | G02F 1/13362 |

FOREIGN PATENT DOCUMENTS

| | | |
|---|---|---|
| CN | 106504717 | 3/2017 |
| CN | 107818768 | 3/2018 |
| CN | 109300434 | 2/2019 |

* cited by examiner

METHOD, DEVICE, AND ELECTRONIC DEVICE FOR ADJUSTING VIEWING ANGLE FOR DARK STATE OF DISPLAY PANEL

RELATED APPLICATIONS

This application is a National Phase of PCT Patent Application No. PCT/CN2020/108619 having International filing date of Aug. 12, 2020, which claims the benefit of priority of Chinese Patent Application No. 202010627774.2 filed on Jul. 2, 2020. The contents of the above applications are all incorporated by reference as if fully set forth herein in their entirety.

FIELD AND BACKGROUND OF THE INVENTION

The present application relates to a display field, and in particular to a method for adjusting a viewing angle for a dark-state of a display panel, and a device and an electronic device thereof.

As viewing angles of liquid crystal display panels increase, and birefringence of liquid crystal molecules in a liquid crystal layer changes with the viewing angles, corresponding image contrast and image clarity continue to decrease. Wide-viewing angle compensation polarizers are usually used to compensate the viewing angles of display panels in the prior art, which may greatly increase image contrast within a certain viewing angle, and effectively reduce a technical problem of light leakage of images in a dark state.

However, the compensation polarizers cannot compensate for light leakage of horizontal and vertical viewing angles in the dark state, which will affect image quality at the horizontal viewing angle in the dark state and reduce display quality of products.

Therefore, a method for adjusting a viewing angle for a dark-state of a display panel is urgently needed to solve the above technical problems.

SUMMARY OF THE INVENTION

The present application provides a method for adjusting a viewing angle for a dark state of a display panel and a device thereof, to solve a technical problem of light leakage of an existing liquid crystal display panel at a large viewing angle in a dark state.

The present application provides a method for adjusting a viewing angle for a dark state of a display panel, comprising steps of:

obtaining a first brightness change of a to-be-tested panel at a first viewing angle under a condition of a first voltage difference;

obtaining a second brightness change of the to-be-tested panel at a second viewing angle under the condition of the first voltage difference; and obtaining a ratio of the second brightness change to the first brightness change, wherein in response to the ratio of the second brightness change to the first brightness change being less than or equal to a first threshold, the first voltage difference acts as a selection voltage of the display panel, and in response to the ratio of the second brightness change to the first brightness change being greater than the first threshold, the first voltage difference acts as a non-selection voltage of the display panel.

According to the method for adjusting the viewing angle for the dark state of the display panel, obtaining the first brightness change of the to-be-tested panel at the first viewing angle under the condition of the first voltage difference comprises steps of:

obtaining a first brightness of the to-be-tested panel at the first viewing angle under a condition of a first voltage;

obtaining a second brightness of the to-be-tested panel at the first viewing angle under a condition of a second voltage; and obtaining the first brightness change of the to-be-tested panel under the condition of the first voltage difference according to the first brightness of the to-be-tested panel under the condition of the first voltage and the second brightness of the to-be-tested panel under the condition of the second voltage, wherein the first viewing angle is a front view angle of 0°, the first voltage difference is an absolute value of a difference between the first voltage and the second voltage, and the first brightness change is an absolute value of a difference between the first brightness and the second brightness; and wherein the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

According to the method for adjusting the viewing angle for the dark state of the display panel, obtaining the second brightness change of the to-be-tested panel at the second viewing angle under the condition of the first voltage difference comprises steps of:

obtaining a third brightness of the to-be-tested panel at the second viewing angle under the condition of the first voltage;

obtaining a fourth brightness of the to-be-tested panel at the second viewing angle under the condition of the second voltage; and obtaining the second brightness change of the to-be-tested panel under the condition of the first voltage difference according to the third brightness of the to-be-tested panel under the condition of the first voltage and the fourth brightness of the to-be-tested panel under the condition of the second voltage.

Wherein, the second viewing angle is a side view angle of 30° to 60°, and the second brightness change is an absolute value of a difference between the third brightness and the fourth brightness.

According to the method for adjusting the viewing angle for the dark state of the display panel, obtaining the ratio of the second brightness change to the first brightness change comprises steps of:

obtaining a first ratio L(h) of the second brightness change to the first brightness change of the to-be-tested panel under the condition of the first voltage difference H;

obtaining a second ratio L(0) of the second brightness change to the first brightness change of the to-be-tested panel under a condition that the first voltage difference H is 0V; and obtaining a third ratio of the to-be-tested panel under the condition of the first voltage difference, wherein the third ratio is a ratio of a difference between the first ratio L(h) and the second ratio L(0) to the first ratio L(h).

According to the method for adjusting the viewing angle for the dark state of the display panel, in response to the first ratio being less than or equal to 1%, the first voltage difference acts as the selection voltage of the display panel, and in response to the first ratio being greater than 1%, the first voltage difference acts as the non-selection voltage of the display panel.

According to the method for adjusting the viewing angle for the dark state of the display panel, in response to the first threshold being 1%, the first voltage difference is between 0 and 0.4V.

The present application further provides a device for adjusting a viewing angle for a dark state of a display panel, comprising a first obtaining module, a second obtaining module, a calculation module, and a determination module, wherein the first obtaining module is configured to obtain a first brightness change of a to-be-tested panel at a first viewing angle under a condition of a first voltage difference;

wherein the second obtaining module is configured to obtain a second brightness change of the to-be-tested panel at a second viewing angle under the condition of the first voltage difference;

wherein the calculation module is configured to obtain a ratio of the second brightness change to the first brightness change; and wherein the determination module is configured to determine in response to the ratio of the second brightness change to the first brightness change being less than or equal to a first threshold, the first voltage difference acts as a selection voltage of the display panel, and to determine in response to the ratio of the second brightness change to the first brightness change being greater than the first threshold value, the first voltage difference acts as a non-selection voltage of the display panel.

According to the device for adjusting the viewing angle for the dark state of the display panel, the first obtaining module comprises a first brightness obtaining unit, a second brightness obtaining unit, and a first brightness calculation unit, wherein the first brightness obtaining unit is configured to obtain a first brightness of the to-be-tested panel at the first viewing angle under a condition of a first voltage;

wherein the second brightness obtaining unit is configured to obtain a second brightness of the to-be-tested panel at the first viewing angle under a condition of a second voltage;

wherein the first brightness calculation unit is configured to obtain the first brightness change of the to-be-tested panel under the condition of the first voltage difference according to the first brightness of the to-be-tested panel under the condition of the first voltage and the second brightness of the to-be-tested panel under the condition of the second voltage;

wherein the first viewing angle is a front view angle of 0°, the first voltage difference is an absolute value of a difference between the first voltage and the second voltage, and the first brightness change is an absolute value of a difference between the first brightness and the second brightness; and wherein the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

According to the device for adjusting the viewing angle for the dark state of the display panel, the second obtaining module comprises a third brightness obtaining unit, a fourth brightness obtaining unit, and a second brightness calculation unit, wherein the third brightness obtaining unit is configured to obtain a third brightness of the to-be-tested panel at the second viewing angle under the condition of the first voltage;

wherein the fourth brightness obtaining unit is configured to obtain a fourth brightness of the to-be-tested panel at the second viewing angle under the condition of the second voltage; and wherein the second brightness calculation unit is configured to obtain the second brightness change of the to-be-tested panel under the condition of the first voltage difference according to the third brightness of the to-be-tested panel under the condition of the first voltage and the fourth brightness of the to-be-tested panel under the condition of the second voltage.

Wherein, the device as claimed in claim 10, wherein the second viewing angle is a side view angle of 30° to 60°, and the second brightness change is an absolute value of a difference between the third brightness and the fourth brightness.

According to the device for adjusting the viewing angle for the dark state of the display panel, the calculation module comprises a first calculation unit, a second calculation unit, and a third calculating unit, wherein the first calculation unit is configured to obtain a first ratio L(h) of the second brightness change to the first brightness change of the to-be-tested panel under the condition of the first voltage difference H;

wherein the second calculation unit is configured to obtain a second ratio L(0) of the second brightness change and the first brightness change of the to-be-tested panel under a condition that the first voltage difference H is 0V; and wherein the third calculation unit is configured to obtain a third ratio of the to-be-tested panel under the condition of the first voltage difference, and the third ratio is a ratio of a difference between the first ratio L(h) and the second ratio L(0) to the first ratio L(h).

According to the device for adjusting the viewing angle for the dark state of the display panel, in response to the first ratio being less than or equal to 1%, the first voltage difference acts as the selection voltage of the display panel, and in response to the first ratio being greater than 1%, the first voltage difference acts as the non-selection voltage of the display panel.

According to the device for adjusting the viewing angle for the dark state of the display panel, in response to the first threshold being 1%, the first voltage difference is between 0 and 0.4V.

The present application further provides an electronic device, comprising a memory and a processor, wherein a computer program is stored in the memory, the processor is configured to execute the computer program to implement a method for adjusting a viewing angle for a dark state of a display panel, and the method comprises steps of:

obtaining a first brightness change of a to-be-tested panel at a first viewing angle under a condition of a first voltage difference;

obtaining a second brightness change of the to-be-tested panel at a second viewing angle under the condition of the first voltage difference; and obtaining a ratio of the second brightness change to the first brightness change, wherein in response to the ratio of the second brightness change to the first brightness change being less than or equal to a first threshold value, the first voltage difference acts as a selection voltage of the display panel, and in response to the ratio of the second brightness change to the first brightness change being greater than the first threshold, the first voltage difference acts as a non-selection voltage of the display panel.

According to the electronic device, obtaining the first brightness change of the to-be-tested panel at the first viewing angle under the condition of the first voltage difference comprises steps of:

obtaining a first brightness of the to-be-tested panel at the first viewing angle under a condition of a first voltage;

obtaining a second brightness of the to-be-tested panel at the first viewing angle under a condition of a second voltage; and obtaining the first brightness change of the to-be-tested panel under the condition of the first voltage difference according to the first brightness of the to-be-tested panel under the condition of the first voltage and the second brightness of the to-be-tested panel under the condition of the second voltage, wherein the first viewing angle is a front view angle of 0°, the first voltage difference is an absolute value of a difference between the first voltage and the second voltage, and the first brightness change is an absolute value of a difference between the first brightness and the second brightness; and wherein the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

According to the electronic device, obtaining the second brightness change of the to-be-tested panel at the second viewing angle under the condition of the first voltage difference comprises steps of:

obtaining a third brightness of the to-be-tested panel at the second viewing angle under the condition of the first voltage;

obtaining a fourth brightness of the to-be-tested panel at the second viewing angle under the condition of the second voltage; and obtaining the second brightness change of the to-be-tested panel under the condition of the first voltage difference according to the third brightness of the to-be-tested panel under the condition of the first voltage and the fourth brightness of the to-be-tested panel under the condition of the second voltage.

According to the electronic device, the second viewing angle is a side view angle of 30° to 60°, and the second brightness change is an absolute value of a difference between the third brightness and the fourth brightness.

According to the electronic device, obtaining the ratio of the second brightness change to the first brightness change comprises steps of:

obtaining a first ratio L(h) of the second brightness change to the first brightness change of the to-be-tested panel under the condition of the first voltage difference H;

obtaining a second ratio L(0) of the second brightness change to the first brightness change of the to-be-tested panel under a condition that the first voltage difference H is 0V; and obtaining a third ratio of the to-be-tested panel under the condition of the first voltage difference, wherein the third ratio is a ratio of a difference between the first ratio L(h) and the second ratio L(0) to the first ratio L(h).

According to the electronic device, in response to the first ratio being less than or equal to 1%, the first voltage difference acts as the selection voltage of the display panel, and in response to the first ratio being greater than 1%, the first voltage difference acts as the non-selection voltage of the display panel.

The application measures brightness in a dark state of the to-be-tested panel at various viewing angles, and obtains brightness change corresponding to different voltage differences. When the brightness change meets customers' requirements, a corresponding voltage difference acts as a selection voltage of a product; when the brightness change does not meet customers' requirements, a corresponding voltage difference acts as a non-selection voltage of the product. Within a range of the selection voltage, a technical problem of light leakage of an existing liquid crystal display panel in the dark state at a large viewing angle is solved, and display quality of a display device is improved.

DESCRIPTION OF SPECIFIC EMBODIMENTS OF THE INVENTION

To make objectives, technical schemes, and effects of the present application clearer and more specific, the present application is described in further detail below with reference to embodiments in accompanying with appending drawings. It should be understood that specific embodiments described herein are merely for explaining the present application, and the present application is not limited thereto.

As viewing angles of liquid crystal display panels increase, and birefringence of liquid crystal molecules in a liquid crystal layer changes with the viewing angles, corresponding image contrast and image clarity continue to decrease. Wide-viewing angle compensation polarizers are usually used to compensate the viewing angle of display panels in the prior art, which may greatly increase image contrast within a certain viewing angle, and effectively reduce a technical problem of light leakage of images in a dark state. However, the compensation polarizers cannot compensate for light leakage of horizontal and vertical viewing angles in the dark state, which will affect image quality at the horizontal viewing angle in the dark state and reduce display quality of products. Based on the above technical problems, the present application provides a method and a device for adjusting the viewing angle for the dark state of the display panel.

Figure 1:
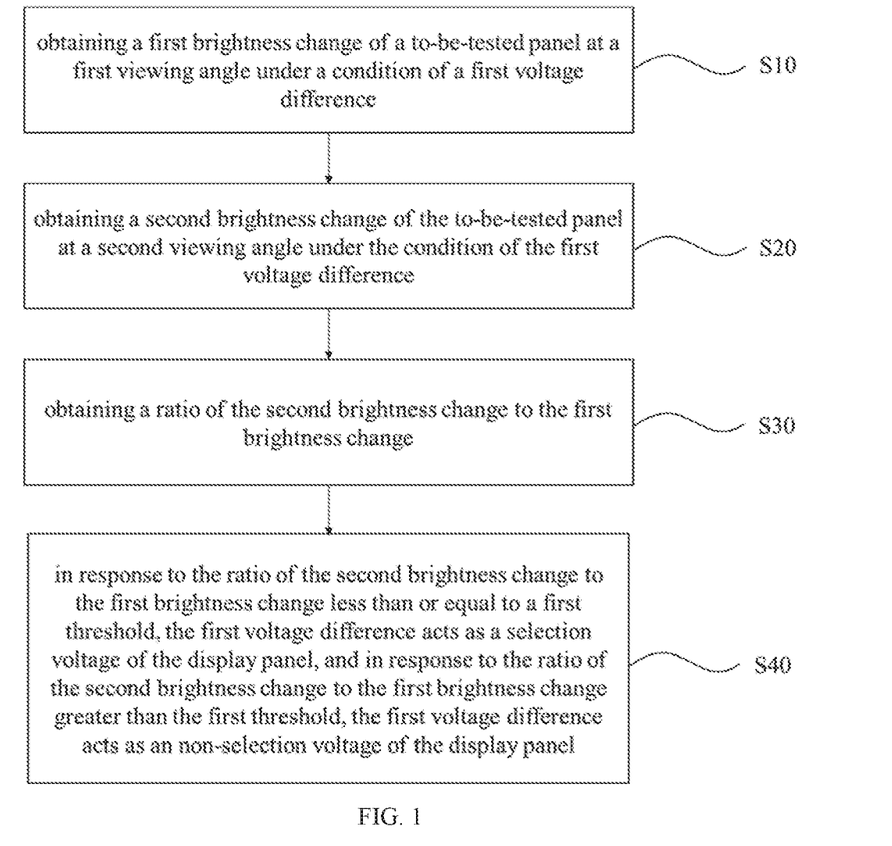
FIG. 1 is a step chart of a method for adjusting a viewing angle for a dark state of a display panel according to the present application.

Referring to FIG. 1, the method for adjusting the viewing angle for the dark state of the display panel includes steps of:

Step S10: obtaining a first brightness change of a to-be-tested panel at a first viewing angle under a condition of a first voltage difference.

In the present embodiment, step S10 specifically includes steps of:

Step S101: obtaining a first brightness of the to-be-tested panel at the first viewing angle under a condition of a first voltage.

Step S102: obtaining a second brightness of the to-be-tested panel at the first viewing angle under a condition of a second voltage.

Step S103: obtaining the first brightness change of the to-be-tested panel under the condition of the first voltage difference according to the first brightness of the to-be-tested panel under the condition of the first voltage and the second brightness of the to-be-tested panel under the condition of the second voltage.

In the present embodiment, the first viewing angle is a front view angle of 0°, the first voltage difference is an absolute value of a difference between the first voltage and the second voltage, and the first brightness change is an absolute value of a difference between the first brightness and the second brightness.

In the present embodiment, the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

In the present embodiment, the first voltage difference is a voltage difference between a positive polarity voltage and a negative polarity voltage under a condition that the to-be-tested panel is in the dark state. For example, when the reference voltage of the common electrode display panel is 5V, and the to-be-tested panel is in a dark state, the first driving voltage is selected to be 5.3V, and the first voltage is 0.3V. That is, the liquid crystal molecules are deflected under the driving of the positive polarity voltage of 0.3V to make the display panel in the dark state, and the first brightness of the to-be-tested panel is measured at the front viewing angle.

Secondly, the polarity of the liquid crystal molecules is reversed, a second driving voltage is selected to be 4.9V, and the second voltage is −0.1V. That is, the liquid crystal molecules are deflected under the driving of the negative polarity voltage of −0.1V to make the display panel in the dark state, and the second brightness of the to-be-tested panel is measured at the front viewing angle.

The obtained first voltage difference is 0.2V according to the first voltage and the second voltage described above, and the first brightness change is obtained according to the first brightness and the second brightness.

Figure 2:
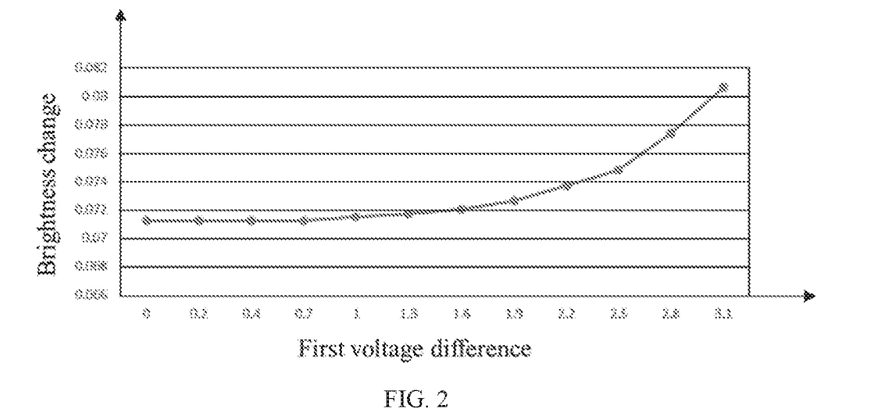
FIG. 2 is a first curve graph of the method for adjusting the viewing angle for the dark state of the display panel according to the present application.

Finally, according to the steps described above, a plurality of data of the voltage differences are collected to obtain a curve in FIG. 2. In FIG. 2, the abscissa refers to the first voltage difference, and the ordinate refers to the first brightness change.

Step S20: obtaining a second brightness change of the to-be-tested panel at a second viewing angle under the condition of the first voltage difference.

In the present embodiment, step S20 specifically includes steps of:

Step S201: obtaining a third brightness of the to-be-tested panel at the second viewing angle under the condition of the first voltage.

Step S202: obtaining a fourth brightness of the to-be-tested panel at the second viewing angle under the condition of the second voltage.

Step S203: obtaining the second brightness change of the to-be-tested panel under the condition of the first voltage difference according to the third brightness of the to-be-tested panel under the condition of the first voltage and the fourth brightness of the to-be-tested panel under the condition of the second voltage.

In the present embodiment, the second viewing angle is a side view angle of 30° to 60°, and the second brightness change is an absolute value of a difference between the third brightness and the fourth brightness.

In the present embodiment, an angle of the second viewing angle may be 30° or 60°.

Figure 3:
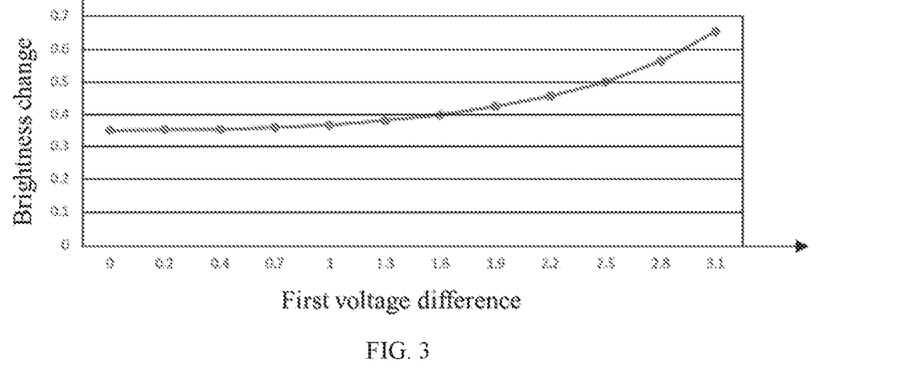
FIG. 3 is a second curve graph of the method for adjusting the viewing angle for the dark state of the display panel according to the present application.

In this step, referring to the step S10, the second brightness change is obtained at the second viewing angle under the condition of different first voltage differences to obtain a curve in FIG. 3. In FIG. 3, the abscissa refers to the first voltage difference, and the ordinate refers to the second brightness change. The curve in FIG. 3 shows data at the side view angle of 60°.

Step S30: obtaining a ratio of the second brightness change to the first brightness change.

In the present embodiment, step S30 specifically includes steps of:

Step S301: obtaining a first ratio L(h) of the second brightness change to the first brightness change of the to-be-tested panel under the condition of the first voltage difference H.

Step S302: obtaining a second ratio L(0) of the second brightness change to the first brightness change of the to-be-tested panel under a condition that the first voltage difference H is 0V.

Step S303: obtaining a third ratio of the to-be-tested panel under the condition of the first voltage difference, wherein the third ratio is a ratio of a difference between the first ratio L(h) and the second ratio L(0) to the first ratio L(h).

Figure 4:
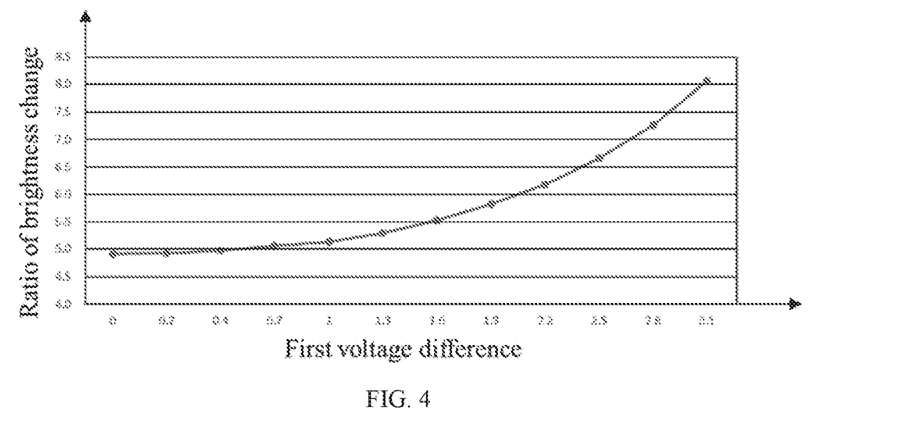
FIG. 4 is a third curve graph of the method for adjusting the viewing angle for the dark state of the display panel according to the present application.

In the step S301, it is mainly used to obtain the ratio of the brightness change of the side viewing angle to the front viewing angle in the dark state under the same first voltage difference, as shown in a curve in FIG. 4. In FIG. 4, the abscissa refers to the first voltage difference, and the ordinate refers to the ratio of the brightness change of the dark-state viewing angle to the front viewing angle under corresponding first voltage differences.

In the step S302, the corresponding ratio of the second brightness change to the first brightness change is the second ratio L(0) when the first voltage difference of 0V is selected, as shown in FIG. 4, the second ratio L(0) is 5.

Figure 5:
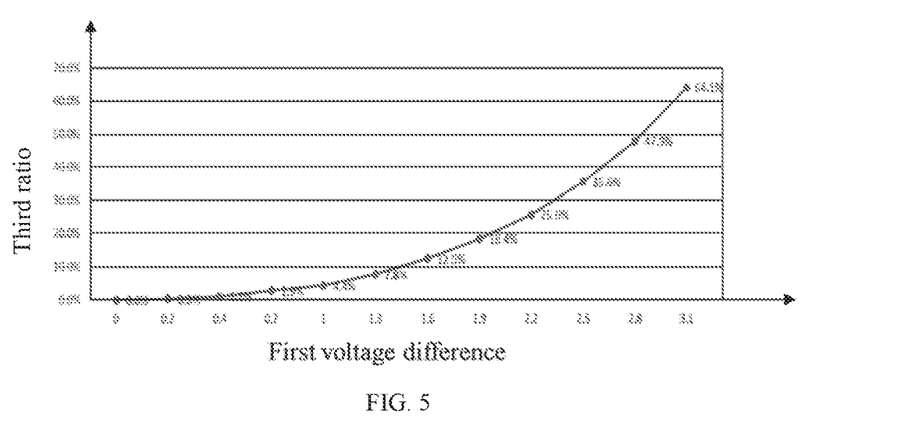
FIG. 5 is a fourth curve graph of the method for adjusting the viewing angle for the dark state of the display panel according to the present application.

In the step S303, firstly, the second ratio L(0) is taken as a reference point to obtain a difference between the first ratio L(h) and the second ratio L(0); secondly, a curve shown in FIG. 5 is obtained by the ratio of the above difference value to the first ratio L(h). In FIG. 5, the abscissa refers to the first voltage difference, and the ordinate refers to the third ratio.

Step S40: in response to the ratio of the second brightness change to the first brightness change being less than or equal to a first threshold, the first voltage difference acts as a selection voltage of the display panel, and in response to the ratio of the second brightness change to the first brightness change being greater than the first threshold, the first voltage difference acts as a non-selection voltage of the display panel.

In the present embodiment, it is determined whether the first voltage difference is the selection voltage of the display panel according to the obtained curve in FIG. 5.

First, a value of the first threshold is selected according to customers' requirements. For example, in response to the first threshold being 1%, that is, when the first ratio is less than or equal to 1%, the first voltage difference acts as the selection voltage of the display panel; and in response to the first ratio being greater than 1%, the first voltage difference acts as the non-selection voltage of the display panel.

In the present embodiment, a value of the first threshold is not limited to 1%, and it can be limited according to customers' requirements.

As shown in FIG. 5, in response to the first threshold being 1%, the corresponding first voltage difference is between 0 and 0.4V. Therefore, the first voltage difference between 0 and 0.4V is the selection voltage of a to-be-tested product.

In addition, a certain percentage increase can be made on the original basis, and the specific percentage increase can be chosen based on customers' requirements. For example, taking the percentage increase of 10% and the aforementioned second ratio L(0) of 5 as an example for explanation, a corresponding first voltage difference (that is, the voltage difference between the positive polarity voltage and negative polarity voltage) is 1.5V, so that a preferable range of the voltage difference between the positive polarity voltage and negative polarity voltage is 0 to 1.5V.

According to different customers' requirements, choosing different ranges of the voltage difference between the positive polarity voltage and negative polarity voltage can prevent the technical problem of light leakage of the liquid crystal display panel in the dark state at a large viewing angle, and improve display quality of the display device.

Figure 6:
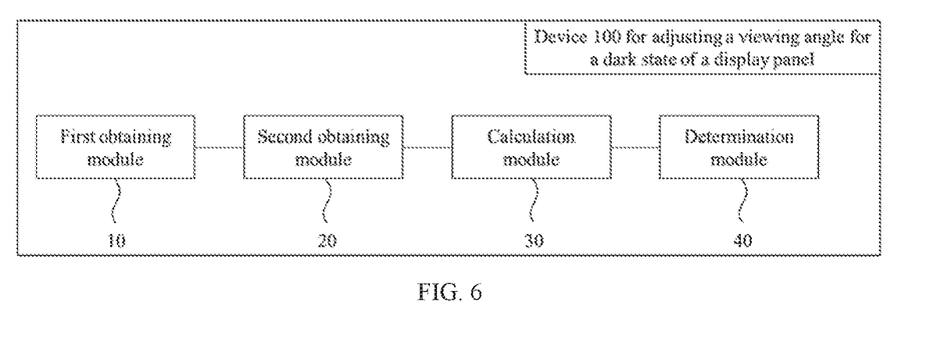
FIG. 6 is a first structural diagram showing a device for adjusting a viewing angle for a dark state of a display panel according to the present application.

Referring to FIG. 6, the present application further provides a device 100 for adjusting a viewing angle for a dark state of a display panel, which includes a first obtaining module 10, a second obtaining module 20, a calculation module 30, and a determination module 40.

The first obtaining module 10 is configured to obtain a first brightness change of a to-be-tested panel at a first viewing angle under a condition of a first voltage difference.

The second obtaining module 20 is configured to obtain a second brightness change of the to-be-tested panel at a second viewing angle under the condition of the first voltage difference.

The calculation module 30 is configured to obtain a ratio of the second brightness change to the first brightness change.

The determination module 40 is configured to determine that the first voltage difference acts as a selection voltage of the display panel in response to the ratio of the second brightness change to the first brightness change being less than or equal to a first threshold, and to determine that the first voltage difference acts as a non-selection voltage of the display panel in response to the ratio of the second brightness change to the first brightness change being greater than the first threshold value.

Figure 7:
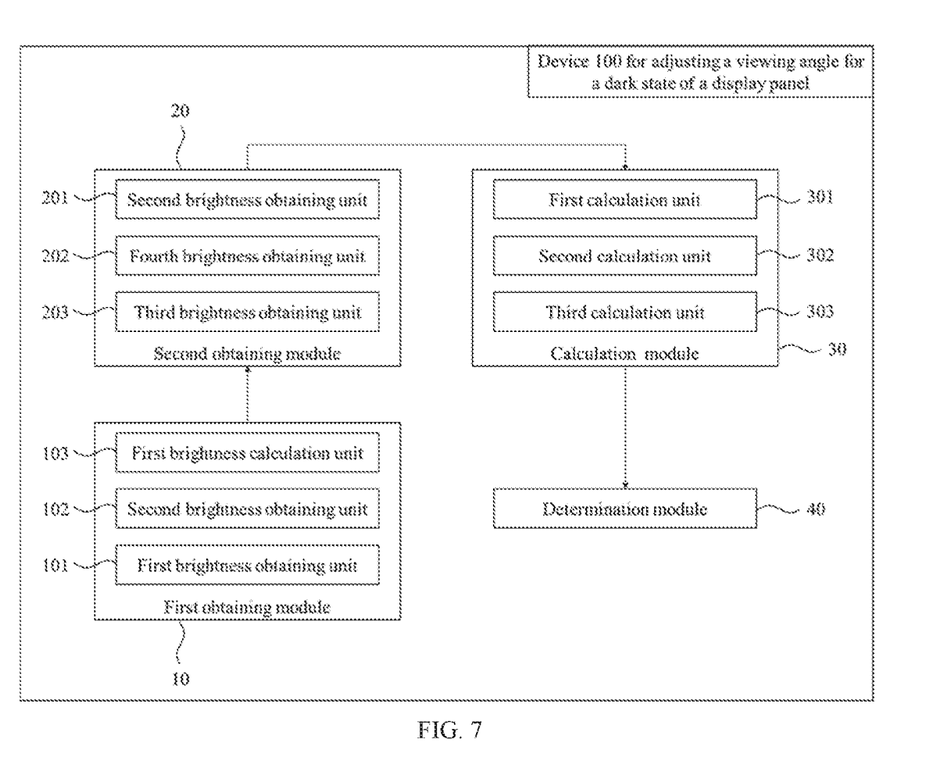
FIG. 7 is a second structure diagram showing a device for adjusting a viewing angle for a dark state of a display panel according to the present application.

Referring to FIG. 7, the first obtaining module 10 includes a first brightness obtaining unit 101, a second brightness obtaining unit 102, and a first brightness calculation unit 103.

The first brightness obtaining unit 101 is configured to obtain a first brightness of the to-be-tested panel at the first viewing angle under a condition of a first voltage.

The second brightness obtaining unit 102 is configured to obtain a second brightness of the to-be-tested panel at the first viewing angle under a condition of a second voltage.

The first brightness calculation unit 103 is configured to obtain the first brightness change of the to-be-tested panel under the condition of the first voltage difference according to the first brightness of the to-be-tested panel under the condition of the first voltage and the second brightness of the to-be-tested panel under the condition of the second voltage.

Wherein, the first viewing angle is a front view angle of 0°, the first voltage difference is an absolute value of a difference between the first voltage and the second voltage, and the first brightness change is an absolute value of a difference between the first brightness and the second brightness.

The first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

Referring to FIG. 7, the second obtaining module 20 includes a third brightness obtaining unit 201, a fourth brightness obtaining unit 202, and a second brightness calculation unit 203.

The third brightness obtaining unit 201 is configured to obtain a third brightness of the to-be-tested panel at the second viewing angle under the condition of the first voltage.

The fourth brightness obtaining unit 202 is configured to obtain a fourth brightness of the to-be-tested panel at the second viewing angle under the condition of the second voltage.

The second brightness calculation unit 203 is configured to obtain the second brightness change of the to-be-tested panel under the condition of the first voltage difference according to the third brightness of the to-be-tested panel under the condition of the first voltage and the fourth brightness of the to-be-tested panel under the condition of the second voltage.

Wherein, the second viewing angle is a side view angle of 30° to 60°, and the second brightness change is an absolute value of a difference between the third brightness and the fourth brightness.

Referring to FIG. 7, the calculation module 30 includes a first calculation unit 301, a second calculation unit 302, and a third calculating unit 303.

The first calculation unit 301 is configured to obtain a first ratio L(h) of the second brightness change to the first brightness change of the to-be-tested panel under the condition of the first voltage difference H.

The second calculation unit 302 is configured to obtain a second ratio L(0) of the second brightness change and the first brightness change of the to-be-tested panel under a condition that the first voltage difference H is 0V.

The third calculation unit 303 is configured to obtain a third ratio of the to-be-tested panel under the condition of the first voltage difference, and the third ratio is a ratio of a difference between the first ratio L(h) and the second ratio L(0) to the first ratio L(h).

According to the device for adjusting the viewing angle for the dark state of the display panel provided by the present application, in response to the first ratio being less than or equal to 1%, the first voltage difference acts as the selection voltage of the display panel; and in response to the first ratio being greater than 1%, the first voltage difference acts as the non-selection voltage of the display panel.

In the present embodiment, the relevant working principle of the device can be referred to the method described above, which will not be repeated here.

The present application further provides an electronic device, which includes a memory and a processor.

In the present embodiment, a computer program is stored in the memory, the processor is configured to execute the computer program to implement a method for adjusting a viewing angle for a dark state of a display panel, which will not be repeated here.

The present application further provides a computer-readable storage medium on which a computer program is stored. When the computer program is executed by a processor, the method for adjusting a viewing angle for a dark state of a display panel is implemented, which will not be repeated here.

The present application provides a method, a device, and an electronic device for adjusting a viewing angle for a dark state of a display panel, and the method includes steps of: obtaining a first brightness change of a to-be-tested panel at a first viewing angle under a condition of a first voltage difference; obtaining a second brightness change of the to-be-tested panel at a second viewing angle under the condition of the first voltage difference; obtaining a ratio of the second brightness change to the first brightness change; comparing the ratio of the second brightness change to the first brightness change with a first threshold to determine whether the first voltage difference is a selection voltage of the display panel. The application measures brightness in the dark state of the to-be-tested panel at various viewing angles, and obtains brightness change corresponding to different voltage differences. When the brightness change meets customers' requirements, a corresponding voltage difference acts as a selection voltage of a product, when the brightness change does not meet customers' requirements, a corresponding voltage difference acts as a non-selection voltage of the product. Within a range of the selection voltage, a technical problem of light leakage of an existing liquid crystal display panel in the dark state at a large viewing angle is solved, and display quality of a display device is improved.

It can be understood that persons skilled in this art, equivalent replacements or changes can be made according to technical solutions of the present application and its inventive concepts, and all these changes or replacements shall fall within the protection scope of the appended claims of the present application.

What is claimed is:

1. A method for adjusting a viewing angle for a dark state of a display panel, comprising steps of:
   obtaining a first brightness change of a to-be-tested panel at a first viewing angle under a condition of a first voltage difference;
   obtaining a second brightness change of the to-be-tested panel at a second viewing angle under the condition of the first voltage difference; and
   obtaining a ratio of the second brightness change to the first brightness change, comprising steps of:
      obtaining a first ratio of the second brightness change to the first brightness change of the to-be-tested panel under the condition of the first voltage difference;
      obtaining a second ratio of the second brightness change to the first brightness change of the to-be-tested panel under a condition that the first voltage difference is 0V; and
      obtaining a third ratio of the to-be-tested panel under the condition of the first voltage difference, wherein the third ratio is a ratio of a difference between the first ratio and the second ratio to the first ratio,
   wherein in response to the ratio of the second brightness change to the first brightness change being less than or equal to a first threshold, the first voltage difference acts as a selection voltage of the display panel, and in response to the ratio of the second brightness change to the first brightness change being greater than the first threshold, the first voltage difference acts as a non-selection voltage of the display panel.

2. The method as claimed in claim 1, wherein obtaining the first brightness change of the to-be-tested panel at the first viewing angle under the condition of the first voltage difference comprises steps of:
   obtaining a first brightness of the to-be-tested panel at the first viewing angle under a condition of a first voltage;
   obtaining a second brightness of the to-be-tested panel at the first viewing angle under a condition of a second voltage; and
   obtaining the first brightness change of the to-be-tested panel under the condition of the first voltage difference according to the first brightness of the to-be-tested panel under the condition of the first voltage and the second brightness of the to-be-tested panel under the condition of the second voltage,
   wherein the first viewing angle is a front view angle of 0°, the first voltage difference is an absolute value of a difference between the first voltage and the second voltage, and the first brightness change is an absolute value of a difference between the first brightness and the second brightness; and
   wherein the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

3. The method as claimed in claim 2, wherein obtaining the second brightness change of the to-be-tested panel at the second viewing angle under the condition of the first voltage difference comprises steps of:
   obtaining a third brightness of the to-be-tested panel at the second viewing angle under the condition of the first voltage;
   obtaining a fourth brightness of the to-be-tested panel at the second viewing angle under the condition of the second voltage; and
   obtaining the second brightness change of the to-be-tested panel under the condition of the first voltage difference according to the third brightness of the to-be-tested panel under the condition of the first voltage and the fourth brightness of the to-be-tested panel under the condition of the second voltage.

4. The method as claimed in claim 3, wherein the second viewing angle is a side view angle of 30° to 60°, and the second brightness change is an absolute value of a difference between the third brightness and the fourth brightness.

5. The method as claimed in claim 1, wherein in response to the third ratio being less than or equal to 1%, the first voltage difference acts as the selection voltage of the display panel, and in response to the third ratio being greater than 1%, the first voltage difference acts as the non-selection voltage of the display panel.

6. The method as claimed in claim 5, wherein in response to the first threshold being 1%, the first voltage difference is between 0 and 0.4V.

7. A device for adjusting a viewing angle for a dark state of a display panel, wherein a computer program is stored in a memory, a processor is configured to execute the computer program to implement a method for adjusting the viewing angle for the dark state of the display panel, and the method comprises steps of:
   obtaining a first brightness change of a to-be-tested panel at a first viewing angle under a condition of a first voltage difference;
   obtaining a second brightness change of the to-be-tested panel at a second viewing angle under the condition of the first voltage difference; and
   obtaining a ratio of the second brightness change to the first brightness change, comprising steps of:
      obtaining a first ratio of the second brightness change to the first brightness change of the to-be-tested panel under the condition of the first voltage difference;
      obtaining a second ratio of the second brightness change to the first brightness change of the to-be-tested panel under a condition that the first voltage difference is 0V; and
      obtaining a third ratio of the to-be-tested panel under the condition of the first voltage difference, wherein the third ratio is a ratio of a difference between the first ratio and the second ratio to the first ratio,
   wherein in response to the ratio of the second brightness change to the first brightness change being less than or equal to a first threshold, the first voltage difference acts as a selection voltage of the display panel, and in response to the ratio of the second brightness change to the first brightness change being greater than the first threshold, the first voltage difference acts as a non-selection voltage of the display panel.

8. The device as claimed in claim 7, wherein obtaining the first brightness change of the to-be-tested panel at the first viewing angle under the condition of the first voltage difference comprises steps of:
   obtaining a first brightness of the to-be-tested panel at the first viewing angle under a condition of a first voltage;
   obtaining a second brightness of the to-be-tested panel at the first viewing angle under a condition of a second voltage; and
   obtaining the first brightness change of the to-be-tested panel under the condition of the first voltage difference according to the first brightness of the to-be-tested panel under the condition of the first voltage and the second brightness of the to-be-tested panel under the condition of the second voltage,
   wherein the first viewing angle is a front view angle of 0°, the first voltage difference is an absolute value of a difference between the first voltage and the second voltage, and the first brightness change is an absolute value of a difference between the first brightness and the second brightness; and
   wherein the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

9. The device as claimed in claim 8, wherein obtaining the second brightness change of the to-be-tested panel at the second viewing angle under the condition of the first voltage difference comprises steps of:
   obtaining a third brightness of the to-be-tested panel at the second viewing angle under the condition of the first voltage;
   obtaining a fourth brightness of the to-be-tested panel at the second viewing angle under the condition of the second voltage; and
   obtaining the second brightness change of the to-be-tested panel under the condition of the first voltage difference according to the third brightness of the to-be-tested panel under the condition of the first voltage and the fourth brightness of the to-be-tested panel under the condition of the second voltage.

10. The device as claimed in claim 9, wherein the second viewing angle is a side view angle of 30° to 60°, and the second brightness change is an absolute value of a difference between the third brightness and the fourth brightness.

11. The device as claimed in claim 7, wherein in response to the third ratio being less than or equal to 1%, the first voltage difference acts as the selection voltage of the display panel, and in response to the third ratio being greater than 1%, the first voltage difference acts as the non-selection voltage of the display panel.

12. The device as claimed in claim 11, wherein in response to the first threshold being 1%, the first voltage difference is between 0 and 0.4V.

13. An electronic device, comprising a memory and a processor, wherein a computer program is stored in the memory, the processor is configured to execute the computer program to implement a method for adjusting a viewing angle for a dark state of a display panel, and the method comprises steps of:
   obtaining a first brightness change of a to-be-tested panel at a first viewing angle under a condition of a first voltage difference;
   obtaining a second brightness change of the to-be-tested panel at a second viewing angle under the condition of the first voltage difference; and
   obtaining a ratio of the second brightness change to the first brightness change, comprising steps of:
      obtaining a first ratio of the second brightness change to the first brightness change of the to-be-tested panel under the condition of the first voltage difference;
      obtaining a second ratio of the second brightness change to the first brightness change of the to-be-tested panel under a condition that the first voltage difference is 0V; and
      obtaining a third ratio of the to-be-tested panel under the condition of the first voltage difference, wherein the third ratio is a ratio of a difference between the first ratio and the second ratio to the first ratio,
   wherein in response to the ratio of the second brightness change to the first brightness change being less than or equal to a first threshold, the first voltage difference acts as a selection voltage of the display panel, and in response to the ratio of the second brightness change to the first brightness change being greater than the first threshold, the first voltage difference acts as a non-selection voltage of the display panel.

14. The electronic device as claimed in claim 13, wherein obtaining the first brightness change of the to-be-tested panel at the first viewing angle under the condition of the first voltage difference comprises steps of:
- obtaining a first brightness of the to-be-tested panel at the first viewing angle under a condition of a first voltage;
- obtaining a second brightness of the to-be-tested panel at the first viewing angle under a condition of a second voltage; and
- obtaining the first brightness change of the to-be-tested panel under the condition of the first voltage difference according to the first brightness of the to-be-tested panel under the condition of the first voltage and the second brightness of the to-be-tested panel under the condition of the second voltage,
- wherein the first viewing angle is a front view angle of 0°, the first voltage difference is an absolute value of a difference between the first voltage and the second voltage, and the first brightness change is an absolute value of a difference between the first brightness and the second brightness; and
- wherein the first voltage is an absolute value of a difference between a first driving voltage of the display panel and a reference voltage of a common electrode of the display panel, and the second voltage is an absolute value of a difference between a second driving voltage of the display panel and the reference voltage of the common electrode of the display panel.

15. The electronic device as claimed in claim 14, wherein obtaining the second brightness change of the to-be-tested panel at the second viewing angle under the condition of the first voltage difference comprises steps of:
- obtaining a third brightness of the to-be-tested panel at the second viewing angle under the condition of the first voltage;
- obtaining a fourth brightness of the to-be-tested panel at the second viewing angle under the condition of the second voltage; and
- obtaining the second brightness change of the to-be-tested panel under the condition of the first voltage difference according to the third brightness of the to-be-tested panel under the condition of the first voltage and the fourth brightness of the to-be-tested panel under the condition of the second voltage.

16. The electronic device as claimed in claim 15, wherein the second viewing angle is a side view angle of 30° to 60°, and the second brightness change is an absolute value of a difference between the third brightness and the fourth brightness.

17. The electronic device as claimed in claim 13, wherein in response to the third ratio being less than or equal to 1%, the first voltage difference acts as the selection voltage of the display panel, and in response to the third ratio being greater than 1%, the first voltage difference acts as the non-selection voltage of the display panel.

* * * * *